US010576970B2

(12) United States Patent
Rittger et al.

(10) Patent No.: US 10,576,970 B2
(45) Date of Patent: Mar. 3, 2020

(54) DRIVER ASSISTANCE METHOD AND SYSTEM

(71) Applicant: GM GLOBAL TECHNOLOGY OPERATIONS LLC, Detroit, MI (US)

(72) Inventors: Lena Rittger, Elsenfeld (DE); Markus Peter Armbrust, Wonsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 16/014,806

(22) Filed: Jun. 21, 2018

(65) Prior Publication Data

US 2018/0370528 A1 Dec. 27, 2018

(30) Foreign Application Priority Data

Jun. 23, 2017 (DE) .................. 10 2017 005 967

(51) Int. Cl.
*B60W 30/09* (2012.01)
*G06K 9/00* (2006.01)
*B60W 30/095* (2012.01)
*B60W 50/14* (2020.01)
*B60W 30/18* (2012.01)

(52) U.S. Cl.
CPC ........ *B60W 30/09* (2013.01); *B60W 30/0953* (2013.01); *B60W 30/0956* (2013.01); *B60W 30/18154* (2013.01); *B60W 50/14* (2013.01); *G06K 9/00798* (2013.01); *G06K 9/00805* (2013.01); *G06K 9/00818* (2013.01)

(58) Field of Classification Search
CPC .. B60W 30/09; B60W 30/0956; B60W 50/14; B60W 30/18154; B60W 30/0953; B60W 2550/20; B60W 2550/22; B60W 2550/10; G06K 9/00805; G06K 9/00798; G06K 9/00818
See application file for complete search history.

(56) References Cited

U.S. PATENT DOCUMENTS

| | | | |
|---|---|---|---|
| 8,699,754 B2* | 4/2014 | Zhang ................ | G06K 9/00798 348/116 |
| 2016/0090087 A1* | 3/2016 | Lee ..................... | B60W 30/143 701/93 |
| 2016/0144859 A1* | 5/2016 | Yoo ................... | B60W 30/0956 701/25 |
| 2017/0076599 A1* | 3/2017 | Gupta ..................... | B60Q 9/00 |
| 2018/0032080 A1* | 2/2018 | Oska ..................... | G05D 1/0219 |
| 2018/0099665 A1* | 4/2018 | You ........................ | B60Q 9/008 |
| 2018/0244275 A1* | 8/2018 | Bremkens ........ | B60W 30/18163 |
| 2019/0143969 A1* | 5/2019 | Al-Stouhi ....... | B60W 30/18154 |

* cited by examiner

*Primary Examiner* — Frederick M Brushaber
(74) *Attorney, Agent, or Firm* — Lorenz & Kopf, LLP

(57) ABSTRACT

A method and system are disclosed for assisting the driver of a motor vehicle while driving through an intersection or road junction where at least three roads converge in a transition area. A future motion of an own or ego vehicle is estimated, and a future motion of a second vehicle is estimated. The probability of a collision between the own vehicle and the second vehicle is estimated based on the respective future motions. A search for a roadway marking arranged in the transition area is executed. If a roadway marking is found, the future motion of at least one of the own vehicle and second vehicle is estimated based on the detected roadway marking. A risk-reducing manuever is executed when the estimated collision probability exceeds a limiting value.

16 Claims, 2 Drawing Sheets

DRIVER ASSISTANCE METHOD AND SYSTEM

CROSS-REFERENCE TO RELATED APPLICATION

This application claims priority to German Patent Application No. 102017005967.5, filed Jun. 23, 2017, which is incorporated herein by reference in its entirety.

TECHNICAL FIELD

The present disclosure pertains to a method and system for assisting the driver of a motor vehicle while traversing an intersection or road junction, and more particularly for reducing the risk of a collisions that can occur when the path of travel for different vehicles intersect on the transition area.

BACKGROUND

Various assistance systems in the art may detect roadway markings—such as a boundary line or a center line of a road—and adjacent vehicles. These systems may either warn the driver if the distance from the roadway marking or from a leading vehicle changes in a potentially critical manner or steer the motor vehicle autonomously at an appropriate distance from the roadway marking and from other vehicles.

Such an assistance system typically has to ignore oncoming vehicles while driving on open roads because there is no risk of a collision when the vehicles use different lanes and constant warnings of the assistance system about oncoming traffic would only annoy the driver. Even at an intersection or road junction, a warning about oncoming traffic or another measure for reducing the risk of a collision is only useful if the driver is actually oblivious to the oncoming traffic and has not taken any suitable measures for preventing a collision.

SUMMARY

The present disclosure provides a method and an assistance system, which are capable of reliably taking measures for reducing the risk of a collision in such a situation on the one hand and of minimizing the probability of such measures being taken unnecessarily on the other hand.

According to an embodiment of the present disclosure, a method is disclosed for assisting the driver of a motor vehicle while driving through an intersection or road junction having at least three roads which converge in a transition area. A future motion of an own or ego vehicle is estimated, and a future motion of a second vehicle is estimated. The probability of a collision between the own vehicle and the second vehicle is estimated based on the respective future motions. A search for a roadway marking arranged in the transition area is executed. If a roadway marking is found, the future motion of at least one of the own vehicle and second vehicle is estimated based on the detected roadway marking. A risk-reducing manuever is executed when the estimated collision probability exceeds a limiting value.

Vehicles, having paths of travel which intersect in such a transition area, usually have sufficient space for avoiding one another regardless of the presence or absence of roadway markings. When two vehicles approach one another on an unmarked transition area, it is therefore difficult to predict a trajectory, on which the drivers will attempt to avoid one another, such that there is a higher probability that an assistance system in fact detects a collision risk on a trajectory whereas the driver intends to drive a different trajectory, on which the collision can be prevented. The driver is in the best-case scenario annoyed by a supposedly risk-reducing manuever of the assistance system and in the worst-case scenario impaired with respect to his autonomy of action. If roadway markings are provided, however, there is a higher probability that the drivers of the concerned vehicles intend to orient themselves based on these roadway markings and that, if a collision risk exists while driving along the roadway markings, at least one of the drivers is actually still oblivious to this collision risk such that a risk-reducing manuever executed in such a situation is also perceived as correct and useful by the concerned driver.

Although a collision risk obviously only exists between vehicles that travel on the same road and a detected roadway marking can therefore be relevant for the ego vehicle and for the second vehicle, typical applications of the present disclosure rather concern situations, in which one vehicle turns left and in the process has to cross the path of travel for the other vehicle and a single detected roadway marking is only relevant for one of the vehicles or separate roadway markings exist for each of the two vehicles and, upon their successful detection, are used as the basis for estimating the future motion of both vehicles.

The risk-reducing manuever being executed may be selected from a group of potential manuevers based on the collision probability. In this way, the system can react appropriately to the degree of a potential risk. The system reaction may range from outputting a warning singal for the driver of the ego vehicle to an active intervention in the progressive motion of the vehicle, during which the driver relinquishes control over the vehicle. A risk-reducing manuever in the form of an active intervention in the vehicle motion should be restricted to instances in which a roadway marking was actually detected on the transition area.

In order to minimize the probability of erroneously identifying uneven roadway surfaces, dirt accumulations or the like as roadway markings, it would be possible to interpret a structure on the transition area as roadway marking if it continuously follows the lanes of the incoming roads.

An intersection or road junction may be provided with roadway markings that have different meanings for the ego vehicle and for the second vehicle depending on the direction, from which they approach the respective intersection or junction. After the detection of a roadway marking, it should therefore be decided, for which of the vehicles the roadway marking is relevant, and the future motion of the vehicle, for which the roadway marking is irrelevant, should be estimated without consideration of the roadway marking.

At an intersection or junction, the roadway surface may be provided with roadway markings that only define the path to be followed for certain vehicles, particularly vehicles that turn left, transverse to their driving direction, but are meaningless for vehicles that drive through the intersection straight on in the opposite direction. In order to correctly allocate such lane boundary markers, a detected roadway marking may be determined as relevant for the vehicle, the previous moving direction of which continuously follows the direction of the roadway marking.

A selection between discrete driving directions while driving across the transition area, particularly a decision on the incoming road, on which the transition area should be exited again, can be made based on data of a navigation system. If no navigation system is provided or the navigation system is not in use, it can be assumed that the driver exactly knows the path to be traveled and already takes into account the path, on which the transition area should be exited again, upon entering the transition area. In this case, the decision can be made based on a previous motion of the vehicle.

The present disclosure also provides a driver assistance system with at least one environment sensor for detecting a roadway boundary, the motion of an ego vehicle having the driver assistance system and the motion of a second vehicle, as well as a computer configured to estimate a future motion of the ego vehicle and/or the second vehicle, to estimate the probability of a collision between the ego vehicle and the second vehicle based on their future motions and to execute a risk-reducing manuever when the estimated collision probability exceeds a limiting value.

The present disclosure further provides a computer program product with program code, which enable a computer to exectue the above-described method or to function as computer unit in the above-described driver assistance system, as well as to a machine-readable data carrier, on which program instructions are recorded that enable a computer to function in the above-described manner. In addition, other objects, desirable features and characteristics will become apparent from the subsequent summary and detailed description, and the appended claims, taken in conjunction with the accompanying drawings and this background.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
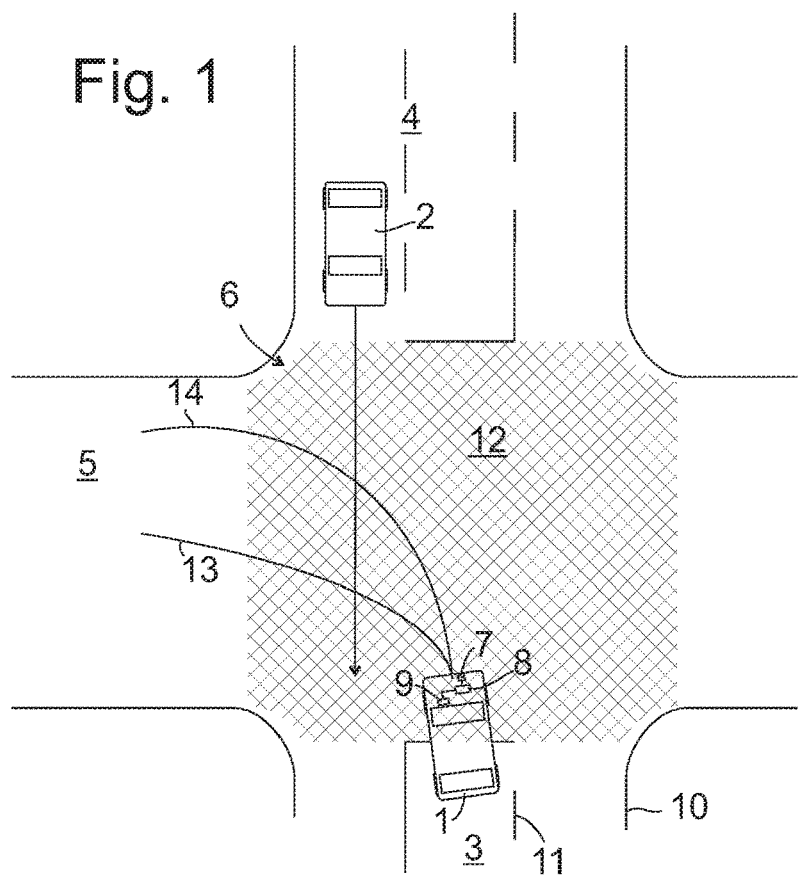
FIGS. 1-3 respectively show a top view of an intersection with multiple vehicles in a typical application situation of the present disclosure.

FIG. 1 shows two vehicles, one of which is referred to as ego vehicle 1 and the other one of which is referred to as second vehicle 2 in the following description. These two vehicles 1, 2 travel on roads 3, 4 and approach a junction area or an intersection 6 with a third road 5 from opposite directions. The ego vehicle 1 is equipped with an environment sensor 7, e.g. a camera or a radar sensor, for detecting other vehicles, as well as the course of the road 3 traveled by the ego vehicle 1, and with an on-board computer 8 for evaluating the data delivered by the environment sensor 7. Based on this data, the on-board computer 8 obtains information on a second vehicle, e.g. the vehicle 2, traveling in the environment of the ego vehicle 1 and other obstacles, with which a collision should be avoided, as well as information on the course of the road 3. It is basically also possible to detect the proper motion of the ego vehicle 1 based on the data of the environment sensor 7. In order to simplify this detection and to improve its reliability, the on-board computer 8 should also receive data from a tachometer, a steering angle sensor, etc.

The on-board computer 8 controls an visual and/or audible signal transmitter 9 in order to thereby warn the driver of the ego vehicle 1. It may furthermore be connected to actuators in the steering system and/or the brake system of the ego vehicle 1 in order to thereby influence the motion of the ego vehicle 1 in case of autonomous vehicle control.

Based on the data of the environment sensor 7, the on-board computer 8 is capable of tracking the motions of the ego vehicle 1 and the second vehicle 2 and of estimating further motions thereof based on the motion sequence detected up to the time shown. Such an estimation may include, for example that the second vehicle 2 will most likely drive through the intersection 6 straight on because it approaches with a disproportionate speed for turning on the road 5. Whereas a deceleration of the ego vehicle 1 and an increase of its distance from the right roadway edge 10 or its crossing of a lane boundary marker 11 between a right and a center lane of the road 3 indicates that the driver intends to turn left on the road 5.

While the on-board computer 8 is in fact capable of deriving the course of the road 5 in the vicinity of the intersection 6 from the data of the environment sensor 7, it is impossible to exactly estimate the path on which the driver will drive across a transition area 12 of the intersection 6 in order to turn on the road 5. The on-board computer 8 cannot estimate if the driver will decide to accelerate in order to still drive across the intersection 4 in front of the second vehicle 2 on the shortest possible path 13 and to thereby also briefly use the clear left lane of the road 5 while turning on this road or if the driver will decide to decelerate further in order to turn on the road 5 behind the second vehicle 2 on a more extensively curved path 14. In this case, it is impractical for the on-board computer 8 influences the motion of the ego vehicle 1 and thereby prevent the driver from a maneuver, by which the driver could drive through the intersection 6 without a collision. However, if the on-board computer 8 reaches the conclusion that an effectively obvious path between the extremes 13 and 14 would lead to a collision with the second vehicle 2, it activates the signal transmitter 9 in order to alert the driver of the collision risk.

Figure 2:
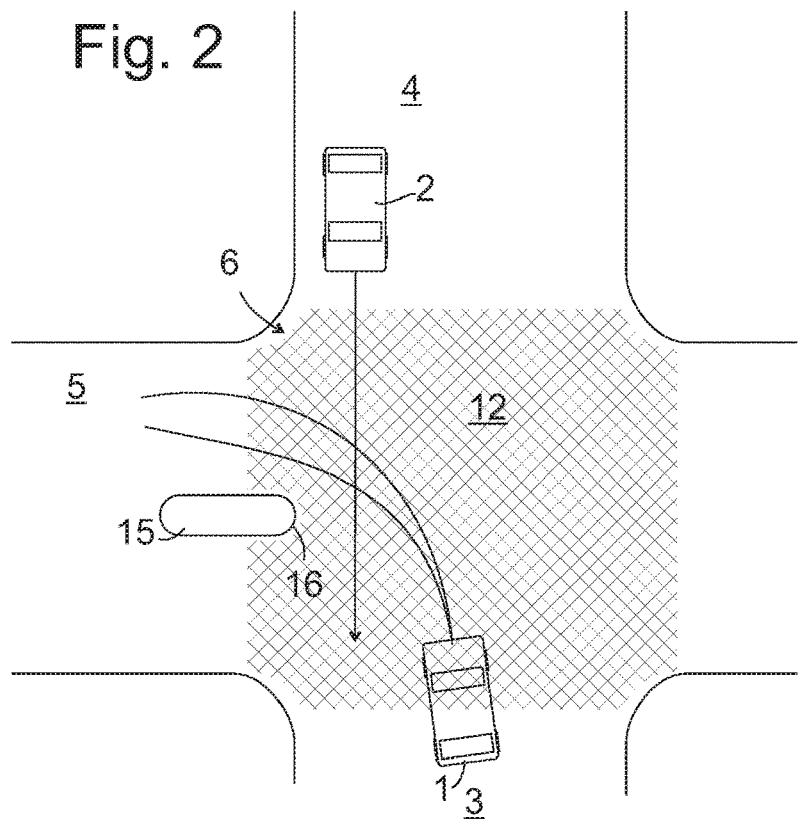

The situation in FIG. 2 can be distinguished from the situation illustrated in FIG. 1 in that a traffic island 15 is arranged at the location, at which the road 5 leads into the intersection 4, wherein a front edge 16 of the traffic island also defines the transition area 12 between the roads 3, 4, 5. The traffic island 15 can be detected by the environment sensor 7, which limits the potential paths, on which the ego vehicle 1 can turn on the road 5. In particular, the island 15 blocks the shortest path 13 in FIG. 1. If the on-board computer 8 in this case reaches the conclusion that there is no option of passing the intersection 6 in front of the second vehicle 2 without a collision, the on-board computer 8 can stop an attempt of the driver to do so by intervening in the steering system and/or the brake system of the ego vehicle 1.

Figure 3:
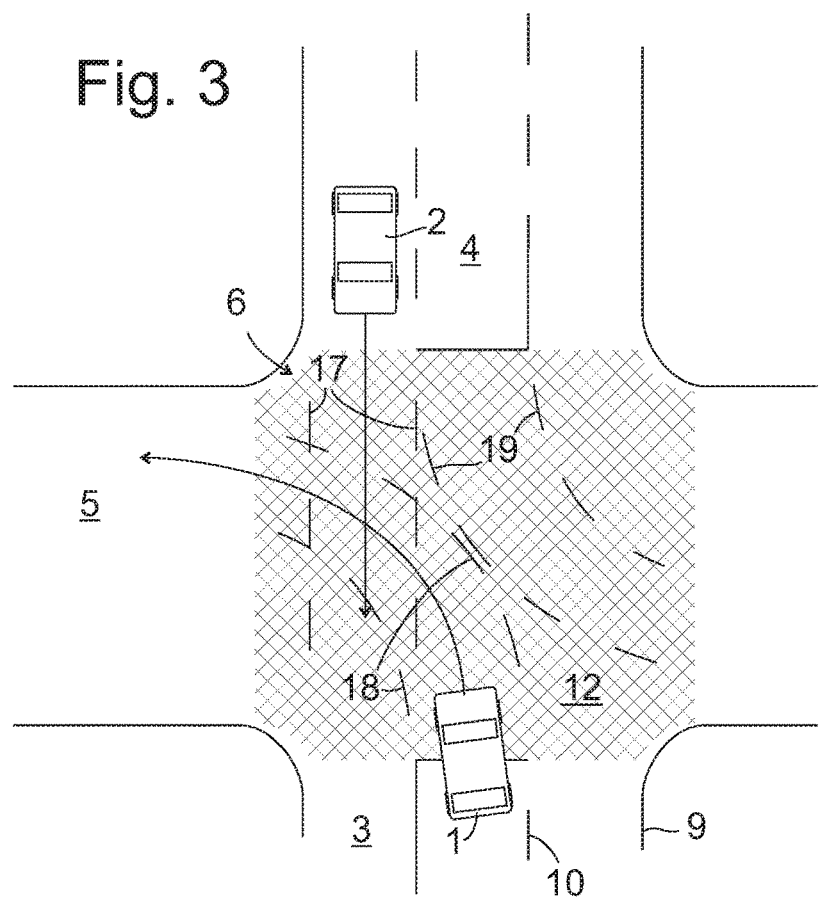

In the situation according to FIG. 3, additional information in the form of lane boundary markers 17, 18, 19, which are painted on the intersection 6 and detected by the environment sensor 6, is made available to the on-board computer 8. The lane boundary markers 17 extend across the transition area 12 straight and define the path, on which the second vehicle 2 will presumably pass the intersection 6. From the viewpoint of the ego vehicle 1, the lane boundary markers 18 form an arc that is directed toward the left and should be followed in order to turn on the road 5 without thereby impairing vehicles, which arrive from the opposite direction of the road 3 and likewise turn left by following the lane boundary markers 19.

Figure 4:
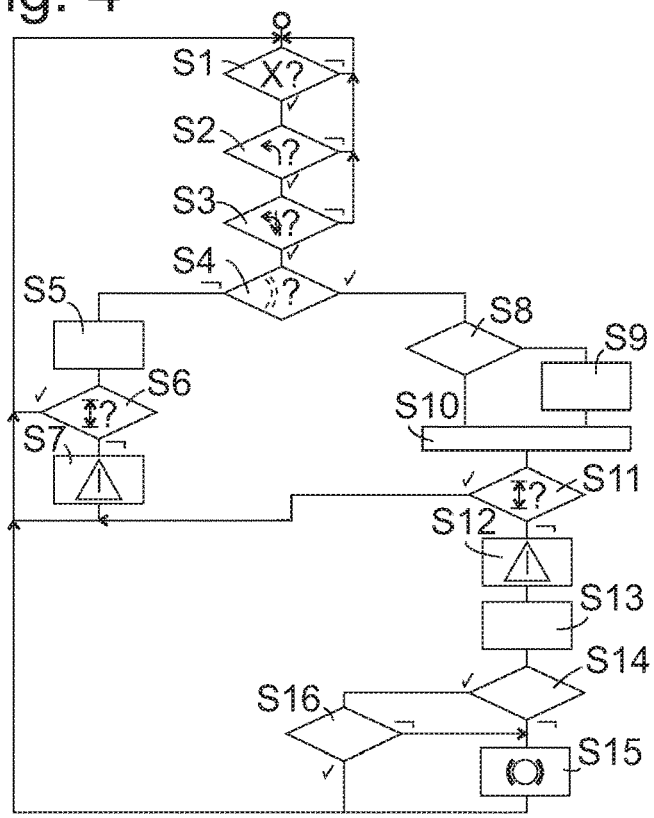
FIG. 4 shows a flow chart of a method of operation of the on-board computer of one of the vehicles in FIGS. 1-3.

FIG. 4 shows a flow chart of a method of operation, which is repeatedly carried out by the on-board computer 8 within short time intervals. The description of the method begins at a time, at which the ego vehicle 1 approaches the intersection 6. Prior to this time, the on-board computer 8 already has periodically analyzed data of the environment sensor 7 and identified other road participants (e.g. second vehicle 2) in the environment of the ego vehicle 1 based on this data, as well as monitored their motion and recorded a time history of the speed and the position of the ego vehicle 1 relative to roadway boundaries of the road 3, e.g. 10, 11, such that corresponding data is available when the method of opertion is initiated.

At S1, the periodic analysis of the data of the environment sensor 7 shows that the ego vehicle 1 approaches the intersection 6. Subsequently, a search for indications of an intended left turn is carried out based on the recorded data concerning the motion of the ego vehicle 1. These indications may include a deceleration of the ego vehicle 1 and an increase of its distance from the right roadway edge 10, its crossing of the lane boundary marker 11 from the right toward the left or the activation of a blinker. If these indications are detected, it is determined at S2 that a left turn is intended.

At S3, it is subsequently checked if other vehicles travel on a route, on which they could collide with the ego vehicle 1 on its further path. For this purpose, the future motion of each other vehicle known to the on-board computer 7 is extrapolated based on the recordings prepared for the respective vehicle and it is checked if a further path intersects the further path of the ego vehicle 1. This question usually can be reliably answered without detailed information on the further paths of the vehicles 1, 2 because the second vehicle 2 cannot drive through the intersection 4 straight on without thereby intersecting the further path of the ego vehicle 1 in the situation illustrated in FIGS. 1-3.

If the paths actually intersect, the on-board computer 8 initially searches the data of the environment sensor 8 for reference points that make it possible to estimate the further path of the two vehicles 1, 2, more precisely. To this end, at S4 this data is searched for roadway markings on or at the edge of the transition area 12, based on which the drivers of the vehicles 1, 2 will presumably orient themselves.

If this search remains unsuccessful in a situation analogous to FIG. 1, the on-board computer 8 calculates a trajectory, which leads the ego vehicle 1 from its current position to the road 5 with a minimum of steering motion and acceleration or deceleration, based on the current speed and driving direction of the ego vehicle 1, as well as a trajectory, which likewise leads the second vehicle 2 to the road 3 with a minimum of steering motion and acceleration or deceleration, and calculates the distance that the vehicles 1, 2 maintain from one another while they follow these trajectories (S5). If it is determined at S6 that a minimum safety clearance is maintained, nothing further takes place and the method returns to its beginning. If the minimum safety clearance cannot be maintained, the on-board computer 8 outputs a warning (S7) via the signal transmitter 9 and then returns to the beginning.

If a roadway marking has been detected at S4, it has to be initially determined, for which vehicle 1 or 2 it is relevant. At S8, this decision may be based on the type of roadway marking detected. The edge 16 of the traffic island 15 represents a physical obstacle for the vehicles 1, 2, which cannot be crossed without endangering the vehicle. Consequently, only trajectories, which do not touch the edge 16, can be considered for the future motion of both vehicles 1, 2. In the traffic situation illustrated in FIGS. 1-3, this particularly limits the choice of paths for the ego vehicle 1, on which it can reach the road 5. Paths like the path 13, which briefly extend across the left lane of the road 5, which are blocked by the traffic island 15, can no longer be considered. This enables the on-board computer 8 to predict when and where the ego vehicle 1 will intersect the trajectory of the vehicle 2 in a much more reliable manner than at S5.

The other roadway markings detected at S4 are the lane boundary markers 17, 18, 19. Based on the data of the environment sensor 8, they are determined as flush with the roadway at S8 and therefore can basically be crossed. This is the reason why their course is analyzed at S9.

The lane boundary markers 17 extend parallel to the lanes of the road 3 such that the driving direction of the ego vehicle 1 corresponds to the direction of the lane boundary markers 17 at least at an early stage of entering the transition area 12. At this stage, the on-board computer 8 may still reach the conclusion that the lane boundary marker 17 located adjacent to the ego vehicle 1 is relevant. If the ego vehicle 1 would drive across the intersection 6 straight on along these lane boundary markers 17, the second vehicle 2 would obviously represent no risk. However, once the ego vehicle 1 has advanced further into the transition area 12 and started to veer left as illustrated in FIGS. 1-3, the driving direction and the direction of the lane boundary markers 17 no longer correspond. The lane boundary markers 17 also do not extend orthogonal to the driving direction as it would be the case for a stop marking to be observed by the ego vehicle 1, which may likewise be painted on the transition area 12. Since the direction of the lane boundary markers 17 therefore significantly deviates from the driving direction and from an orthogonal thereto, e.g. by more than 10 or 15°, the on-board computer 8 evaluates the lane boundary markers 17 as irrelevant for the ego vehicle 1.

With respect to the second vehicle 2, it is on the other hand determined that the lane boundary markers 17 correspond to its driving direction. The lane boundary markers 17 are therefore evaluated as relevant for the second vehicle 2.

In the case of the lane boundary markers 18, the on-board computer 8 determines that these lane boundary markers 18 correspond to the driving direction of the ego vehicle 1 and that the ego vehicle 1 will reach the road 5 by following these lane boundary markers 18. The lane boundary markers 18 are therefore classified as relevant for the ego vehicle 1. They are classified as irrelevant for the second vehicle 2 because the driving direction of the second vehicle 2 obliquely intersects the lane boundary markers 18.

The lane boundary markers 19 can be evaluated as irrelevant for the ego vehicle 1 because they are spaced apart therefrom by more than the width of one lane and their direction neither corresponds to the driving direction nor extends perpendicular to the driving direction at their nearest point to the ego vehicle 1. It can only be determined that they are also irrelevant for the second vehicle 2 once the latter enters the transition area and its driving direction begins to deviate from the direction of the nearest point of the lane boundary markers 19.

As a result of S8 and S9, each vehicle 1, 2 is therefore assigned a list of boundaries, which the respective vehicle cannot cross on its path across the transition area 12.

At S10, a trajectory is respectively determined for both vehicles 1, 2 with consideration of these boundaries. The trajectory leads the respective vehicle across the intersection 6 under the same conditions as at S5 with a minimum of steering motion and acceleration or deceleration. A check is made at S11 if the minimum safety clearance is maintained during the motion on these trajectories. If this is the case, the method immediately returns to its beginning. If this is not the case, the on-board computer 8 immediately initiates an emergency braking maneuver of the ego vehicle 1 in a first embodiment. If the on-board computer 8 also has access to the steering system of the ego vehicle 1, it can use the steering system for preventing the ego vehicle 1 from crossing the lane boundary markers 17 in this situation. This ensures that the second vehicle 2 can pass the intersection 6 in an unobstructed manner.

According to a second embodiment, an advance warning may initially be output at S12 and a search for an alternative trajectory for the ego vehicle may be carried out at S13 while the driver has the opportunity to react to the warning. If it is determined at S14 that no suitable trajectory has been found, an active intervention in the progressive motion of the vehicle such as a braking maneuver, a steering input or a combination thereof may be carried out at S15 as applicable.

If a trajectory that maintains the safety clearance is found at S14 and intermediate steering maneuvers of the driver indicate at S16 that the driver is in the process of steering the ego vehicle 1 on this trajectory, the method can once again return to its beginning without intervention of the on-board computer 8. If it is determined that the driver nevertheless still deviates from the trajectory, which was found at S13 and evaluated as safe, during a repetition of the method in the course of driving through the intersection, the method can at this time still switch to step S15 in the course of this repetition of the method.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

The invention claimed is:

1. A method for assisting the driver of an ego vehicle traversing a road junction having at least three roads converging in a transition area, the ego vehicle being equipped with an on-board computer and an on-board sensor, wherein the method comprises:
   evaluating, in the on-board computer, a first path of travel estimated from a future motion of the ego vehicle through the transition area;
   evaluating, in the on-board computer, a second path of travel estimated from on a future motion of a second vehicle through the transition area;
   detecting, with the on-board sensor, at least one roadway marking arranged in the transition area;
   re-evaluating, in the on-board computer, at least one of the first and second paths of travel based on the detected roadway marking;
   estimating, in the on-board computer, a collision probability for the first path of travel intersecting the second path of travel;
   executing a risk-reducing maneuver when the collision probability exceeds a threshold value.

2. The method according to claim 1, wherein the risk-reducing maneuver is selected from a group of potential maneuvers based on the collision probability.

3. The method according to claim 2, wherein the group of potential maneuvers consists of a warning signal in the ego vehicle, an active intervention in the vehicle motion, or a combination thereof.

4. The method according to claim 1, further comprising interpreting a structure in the transition area as roadway marking when the structure continuously follows a lane for one of the at least three roads.

5. The method according to claim 1, further comprising determining a relevance of the roadway marking with respect to the ego vehicle and the second vehicle, and re-evaluating, in the on-board computer, at least one of the first and second paths of travel when the relevance of the roadway marking is above a threshold relevance.

6. The method according to claim 5, further comprising disregarding the roadway marking for re-evaluating the at least one of the first and second paths of travel when the relevance is below a threshold relevance.

7. The method according to claim 5, further comprising determining if a previous moving direction of the ego vehicle or the second vehicle corresponds to a direction of the roadway marking when determining the relevance of the roadway marking.

8. The method according to claim 1, further comprising making a selection between discrete driving directions based on a previous motion of the ego vehicle or the second vehicle when estimating the future motion thereof.

9. A driver assistance system for an ego vehicle comprising:
   at least one sensor configured to detect a motion of the ego vehicle, a motion of a second vehicle and a roadway boundary; and
   a computer unit onboard the ego vehicle in communication with the at least one sensor and configured to:
      evaluate a first path of travel estimated from a future motion of the ego vehicle through the transition area;
      evaluate a second path of travel estimated from on a future motion of a second vehicle through the transition area;
      detect at least one roadway marking arranged in the transition area;
      re-evaluate at least one of the first and second paths of travel based on the detected roadway marking;
      estimate a collision probability for the first path of travel intersecting the second path of travel; and
      execute a risk-reducing maneuver when the collision probability exceeds a threshold value.

10. The driver assistance system according to claim 9, wherein the risk-reducing maneuver is selected from a group of potential maneuvers based on the collision probability.

11. The driver assistance system according to claim 10, wherein the group of potential maneuvers consists of a warning signal in the ego vehicle, an active intervention in the vehicle motion, or a combination thereof.

12. The driver assistance system according to claim 9, wherein the computer unit is further configured to interpret a structure in the transition area as roadway marking when the structure continuously follows a lane for one of the at least three roads.

13. The driver assistance system according to claim 9, wherein the computer unit is further configured to determine a relevance of the roadway marking with respect to the ego vehicle and the second vehicle, and re-evaluate at least one of the first and second paths of travel when the relevance of the roadway marking is above a threshold relevance.

14. The driver assistance system according to claim 13, wherein the computer unit is further configured to disregard the roadway marking for re-evaluating the at least one of the first and second paths of travel when the relevance is below a threshold relevance.

15. The driver assistance system according to claim 13, wherein the computer unit is further configured to determine if a previous moving direction of the ego vehicle or the second vehicle corresponds to a direction of the roadway marking when determining the relevance of the roadway structure.

16. The driver assistance system according to claim 9, wherein the computer unit is further configured to make a selection between discrete driving directions based on a previous motion of the ego vehicle or the second vehicle when estimating the future motion thereof.

* * * * *